United States Patent
Toyoda

(10) Patent No.: US 7,953,095 B2
(45) Date of Patent: May 31, 2011

(54) TRANSMISSION SYSTEM AND TRANSMISSION METHOD

(75) Inventor: Hidehiro Toyoda, Tachikawa (JP)

(73) Assignee: Opnext Japan, Inc., Kanagawa (JP)

(*) Notice: Subject to any disclaimer, the term of this patent is extended or adjusted under 35 U.S.C. 154(b) by 281 days.

(21) Appl. No.: 12/388,784

(22) Filed: Feb. 19, 2009

(65) Prior Publication Data
US 2009/0247068 A1    Oct. 1, 2009

(30) Foreign Application Priority Data
Mar. 27, 2008    (JP) .................... 2008-083009

(51) Int. Cl.
*H04L 12/28* (2006.01)
(52) U.S. Cl. ........................ 370/394; 370/402
(58) Field of Classification Search ............... 370/230.1, 370/389, 391, 393, 394, 401, 402, 476, 535, 370/536, 542; 375/219, 220; 714/700
See application file for complete search history.

(56) References Cited

U.S. PATENT DOCUMENTS

| | | | | |
|---|---|---|---|---|
| 4,032,719 A | * | 6/1977 | Blasbalg | 370/376 |
| 5,408,473 A | * | 4/1995 | Hutchison et al. | 370/506 |
| 6,167,077 A | * | 12/2000 | Ducaroir et al. | 375/219 |
| 6,731,656 B1 | * | 5/2004 | Slater et al. | 370/536 |
| 7,006,500 B1 | * | 2/2006 | Pedersen et al. | 370/394 |
| 7,127,645 B2 | | 10/2006 | Toyoda et al. | |

FOREIGN PATENT DOCUMENTS

JP    2004-193817    7/2004

OTHER PUBLICATIONS

IEEE Std. 802.3-2005, Clause 48, "Physical Coding Sublayer (PCS) and Physical Medium Attachment (PMA) sublayer, type 10GBASE-X".

* cited by examiner

*Primary Examiner* — Kwang Yao
*Assistant Examiner* — Andrew Lai
(74) *Attorney, Agent, or Firm* — Antonelli, Terry, Stout & Kraus, LLP.

(57) ABSTRACT

Provided is a transmission system with increased degree of freedom in a lane configuration, which corrects disalignment of data sequences in respective channels due to differences in arrival time, thereby freely changing a number of lanes. The transmission system includes: a transmitter; a relay; and a receiver, the transmitter inputting data to be transmitted to the receiver, the relay transmitting the data transmitted by the transmitter to the receiver, the receiver receiving the data transmitted by the relay. The transmitter inserts into the data sequences channel information indicating a channel to which the data sequence is to be output. The relay corrects, based on the channel information, disalignment in an order of arrival of the data sequences received via a plurality of channels, the disalignment being generated by the differences in arrival time of the data sequences among the channels.

11 Claims, 13 Drawing Sheets

| PHASE | LANE 0 | LANE 1 | LANE 2 | LANE 3 | LANE 4 | LANE 5 | LANE 6 | LANE 7 | LANE 8 | LANE 9 | |
|---|---|---|---|---|---|---|---|---|---|---|---|
| 12 | L0 P12 | L0 P13 | L1 P12 | L1 P13 | L2 P12 | L2 P13 | L3 P12 | L3 P13 | L4 P12 | L4 P13 | } 64B/66B CODE BLOCK |
| 13 | | | | | | | | | | | |
| 14 | L0 P14 | L0 P15 | L1 P14 | L1 P15 | L2 P14 | L2 P15 | L3 P14 | L3 P15 | L4 P14 | L4 P15 | |
| 15 | | | | | | | | | | | |
| 0 | L0 P0 | L0 P1 | L1 P0 | L1 P1 | L2 P0 | L2 P1 | L3 P0 | L3 P1 | L4 P0 | L4 P1 | |
| 1 | | | | | | | | | | | |
| 2 | L0 P2 | L0 P3 | L1 P2 | L1 P3 | L2 P2 | L2 P3 | L3 P2 | L3 P3 | L4 P2 | L4 P3 | |
| 3 | | | | | | | | | | | |
| 4 | L0 P4 | L0 P5 | L1 P4 | L1 P5 | L2 P4 | L2 P5 | L3 P4 | L3 P5 | L4 P4 | L4 P5 | |
| 5 | | | | | | | | | | | |
| 6 | L0 P6 | L0 P7 | L1 P6 | L1 P7 | L2 P6 | L2 P7 | L3 P6 | L3 P7 | L4 P6 | L4 P7 | |
| 7 | | | | | | | | | | | |
| 8 | L0 P8 | L0 P9 | L1 P8 | L1 P9 | L2 P8 | L2 P9 | L3 P8 | L3 P9 | L4 P8 | L4 P9 | |
| 9 | | | | | | | | | | | |
| 10 | L0 P10 | L0 P11 | L1 P10 | L1 P11 | L2 P10 | L2 P11 | L3 P10 | L3 P11 | L4 P10 | L4 P11 | |
| 11 | | | | | | | | | | | |
| 12 | L0 P12 | L0 P13 | L1 P12 | L1 P13 | L2 P12 | L2 P13 | L3 P12 | L3 P13 | L4 P12 | L4 P13 | |
| 13 | | | | | | | | | | | |
| 14 | L0 P14 | L0 P15 | L1 P14 | L1 P15 | L2 P14 | L2 P15 | L3 P14 | L3 P15 | L4 P14 | L4 P15 | |
| 15 | | | | | | | | | | | |
| 0 | L0 P0 | L0 P1 | L1 P0 | L1 P1 | L2 P0 | L2 P1 | L3 P0 | L3 P1 | L4 P0 | L4 P1 | |
| 1 | | | | | | | | | | | |
| 2 | L0 P2 | L0 P3 | L1 P2 | L1 P3 | L2 P2 | L2 P3 | L3 P2 | L3 P3 | L4 P2 | L4 P3 | |
| 3 | | | | | | | | | | | |

FIG. 12

TRANSMISSION SYSTEM AND TRANSMISSION METHOD

CLAIM OF PRIORITY

The present application claims priority from Japanese patent application JP 2008-83009 filed on Mar. 27, 2008, the content of which is hereby incorporated by reference into this application.

BACKGROUND OF THE INVENTION

This invention relates to a data transmission device for transmitting data via a transmission line, and more particularly, to a data transmission device which can change the number of lanes of a transmission line.

Recently, in the field of data transmission over a long distance, an increase in transmission speed has been saturated for a method of data transmission in a single channel (also referred to as lane). To address this problem, in order to increase the communication bandwidth, a technology of combining a plurality of lanes so as to be considered as a single link has been developed (lane bonding and deskewing between multi-lanes).

IEEE Std. 802.3-2005, Clause 48, "Physical Coding Sublayer (PCS) and Physical Medium Attachment (PMA) sublayer, type 10 GBASE-X" describes a method of transmission over a plurality of lanes as a standardized technology for 10 Gb/s Ethernet. The 10 Gb/s Ethernet combines four lanes of 2.5-Gbps data to realize a transmission speed of 10 Gbps. For the transmission method employing a plurality of lanes, there is a problem of correcting differences in arrival time of data caused by differences in transmission distance among lanes and, for optical transmission, differences in light wavelength in the respective lanes (referred to as skew).

For the 10 Gb/s Ethernet, a transmitter transmits an align column (||A||), which is a special control code of an 8B/10B code, simultaneously on the combined four lanes, and a receiver calculates differences in arrival time of the align column for the respective lanes.

IEEE Std. 802.3-2005, Clause 48, "Physical Coding Sublayer (PCS) and Physical Medium Attachment (PMA) sublayer, type 10 GBASE-X" does not detail a method of correcting the skews based on the calculated differences in arrival time of the align column. However, generally, the skew is corrected by buffering arriving data using a FIFO buffer or a variable-delay circuit by a quantity of the skew specific to the respective lanes.

According to Japanese Patent Application Laid-open No. 2004-193817, a transmitter periodically transmits a patterned signal (data pattern for deskewing), and a receiver generates, based on the received data pattern for deskewing, a clock having a long period, thereby calculating a phase difference of clocks of the respective lanes (namely, skews). The method for correcting the calculated skews is the same as the above-mentioned method employing a FIFO buffer or a variable-delay circuit.

SUMMARY OF THE INVENTION

However, the transmission method employing a plurality of lanes, when a skew is detected based on the transmission code (align column or data pattern for deskewing) described in IEEE Std. 802.3-2005, Clause 48, "Physical Coding Sublayer (PCS) and Physical Medium Attachment (PMA) sublayer, type 10 GBASE-X" and Japanese Patent Application Laid-open No. 2004-193817, poses a problem that a lane configuration (namely, number of lanes) cannot be changed in the course of a transmission line between a transmitter and a receiver. A detailed description is now given of the reason for the fact that the number of lanes cannot be changed in the course of the transmission line according to the transmission method described in IEEE Std. 802.3-2005, Clause 48, "Physical Coding Sublayer (PCS) and Physical Medium Attachment (PMA) sublayer, type 10 GBASE-X" and Japanese Patent Application Laid-open No. 2004-193817.

First, according to the data transmission in the multi-lane configuration described in IEEE Std. 802.3-2005, Clause 48, "Physical Coding Sublayer (PCS) and Physical Medium Attachment (PMA) sublayer, type 10 GBASE-X" and Japanese Patent Application Laid-open No. 2004-193817, the number of lanes is not changed in the course of the transmission line.

The change of the number of lanes implies a change of the number of lanes constituting a link while the transmission speed of the link constituted of the combined plurality of lanes is maintained in the transmission line.

For example, when the transmission speed (total transmission speed) of a link is 100 Gbps, there may be various lane configurations such as a configuration of combining ten lanes with a transmission speed of 10 Gbps and a configuration of combining four lanes with a transmission speed of 25 Gbps.

In the data transmission in a multi-lane configuration, one link must possess a plurality of lanes. For example, for an optical data transmission, there is a possible method in which one optical fiber is allocated to one lane, and a plurality of optical fibers are combined into one link. Moreover, there is another possible method employing the wavelength division multiplexing (WDM), in which, one optical wavelength is allocated to one lane, and a plurality of optical signals of a plurality of optical wavelengths are transmitted over one optical fiber.

However, according to the above-mentioned two methods, the number of lanes which can be allocated to one link is limited.

Specifically, according to the former method, a plurality of optical fibers have to be laid for one link, which poses physical and cost constraints.

Moreover, according to the latter method, the number of the different optical wavelengths which can be transmitted over a single optical fiber is limited, and thus, the number of lanes which can be allocated to a single optical fiber is limited. For example, for a coarse WDM (CWDM) using an optical wavelength of 1,300 nanometers, the number of lanes which can be allocated to a single optical fiber is around five.

As a result, for data transmission over a long distance, there is a need for changing lane configuration, namely, a need for increasing or decreasing the number of lanes constituting a link, in the course of the transmission line.

In general, as a method for changing the number of lanes, a method of time-multiplexing bit data of respective lanes is used.

Specifically, a transmitter outputs data to n lanes, and the n lanes are converted into m lanes by a first relay which is located on the side of the transmitter between the transmitter and the receiver, and has a multiplexer function. Then, these m lanes are converted into n lanes by a second relay which is located on the side of the receiver between the transmitter and the receiver, and has a demultiplexer function. The receiver receives the data from the n lanes, which correspond to the number of the lanes to which the transmitter has output the data.

A description is now given of a specific example (n is three, and m is two).

In this case, the first relay multiplexes three lanes to two lanes, and the second relay demultiplexes the two lanes to three lanes.

To the first relay, the following data is input from the three lanes
(lanes 0 to 2).
lane 0: 0, 3, 6, 9, . . .
lane 1: 1, 4, 7, 10, . . .
lane 2: 2, 5, 8, 11, . . .

Then, the first relay multiplexes the input of the three lanes (lanes 0 to 2) to that of the two lanes (lanes 0 and 1), and outputs the following data to the second relay.
lane 0: 0, 2, 4, 6, 8, 10, . . .
lane 1: 1, 3, 5, 7, 9, 11, . . .

A skew corresponding to one bit has occurred while the data output from the first relay is transmitted to the second relay. In this case, to the second relay, the following data is input from the two lanes (lanes 0 and 1).
lane 0: 0, 2, 4, 6, 8, 10, . . .
lane 1: X, 1, 3, 5, 7, 9, 11, . . . (X is indefinite)

In this case, the second relay demultiplexes the input of the two lanes (lanes 0 and 1) to that of the three lanes (lanes 0 to 2), and outputs the following data to the receiver.
lane 0: 0, 1, 6, 7, 11, . . .
lane 1: X, 4, 5, 10, . . .
lane 2: 2, 3, 8, 9, . . .

The data output from the second relay and the data input to the first relay are different from each other. This case occurs when different prime numbers are contained respectively in prime factors of n and m.

Therefore, the skew occurs while the data is transmitted from the first relay to the second relay. The skew generated during the transmission influences the data demultiplexed by the second relay, and, when different prime numbers are contained respectively in the prime factors of n and m, the second relay cannot make correction for recovering the original data in some cases.

Thus, it is difficult to freely change the number of lanes even when simple multiplexer and demultiplexer, the method according to IEEE Std. 802.3-2005, Clause 48, "Physical Coding Sublayer (PCS) and Physical Medium Attachment (PMA) sublayer, type 10 GBASE-X", and the method according to Japanese Patent Application Laid-open No. 2004-193817 are combined.

It is therefore an object of this invention to provide a transmission system with increased degree of freedom in lane configuration.

According to one embodiment of the invention, there is therefore provided a transmission system, comprising: a transmitter; a relay; and a receiver, the transmitter for receiving data to be transmitted to the receiver, the relay for transmitting the data transmitted by the transmitter to the receiver, the receiver for receiving the data transmitted by the relay, wherein: the transmitter and the relay are coupled by a first transmission line, and the relay and the receiver are coupled by a second transmission line; the first transmission line includes a plurality of channels; the second transmission line includes a plurality of channels different in number from the plurality of channels included in the first transmission line; the transmitter is configured to: distribute the data to be transmitted to data sequences corresponding to a number of the plurality of channels included in the first transmission line to insert into the data sequences channel information indicating a channel to which the distributed data sequence is to be output; and transmit the data to the relay by outputting the distributed data sequences from the plurality of channels included in the first transmission line to the relay; the relay is configured to: detect the channel information inserted into the data sequences received from the plurality of channels included in the first transmission line; correct, based on the detected channel information, disalignment in an order of arrival of the data sequences received via the plurality of channels, the disalignment being generated by differences in arrival time of the data sequences among the plurality of channels; distribute the received data sequences to data sequences corresponding to a number of the plurality of channels included in the second transmission line; and transmit the data to the receiver by outputting the distributed data sequences from the plurality of channels included in the second transmission line to the receiver; and the receiver is configured to: detect the channel information inserted into the data sequences received from the plurality of channels included in the second transmission line; correct, based on the detected channel information, disalignment in an order of arrival of the data sequences received via the plurality of channels, the disalignment being generated by differences in arrival time of the data sequences among the plurality of channels; and distribute the received data sequences to data sequences corresponding to the number of the plurality of channels included in the first transmission line used by the transmitter for transmitting the data.

According to the aspect of this invention, it is possible to provide the transmission system with increased degree of freedom in the lane configuration, which can correct the disalignment of data sequences in respective channels due to differences in arrival time, thereby freely changing the number of lanes.

BRIEF DESCRIPTION OF THE DRAWINGS

The present invention can be appreciated by the description which follows in conjunction with the following figures, wherein:

FIG. 3 is a data sequences output by the marker inserter according to the embodiment of this invention;

FIG. 9 is a data sequences output from the m:p demultiplexer according to the embodiment of this invention;

FIG. 11 is a data sequences output from the deskew buffer according to the embodiment of this invention;

FIG. 12 is a data sequences received by the receiver according to the embodiment of this invention.

DETAILED DESCRIPTION OF THE PREFERRED EMBODIMENT

A description is now given of an embodiment of this invention referring to FIGS. 1 to 13. In this embodiment, an example using, as a transmission code, a 64B/66B code is described, but a different transmission code (such as 8B/10B code) may be used.

Figure 1:
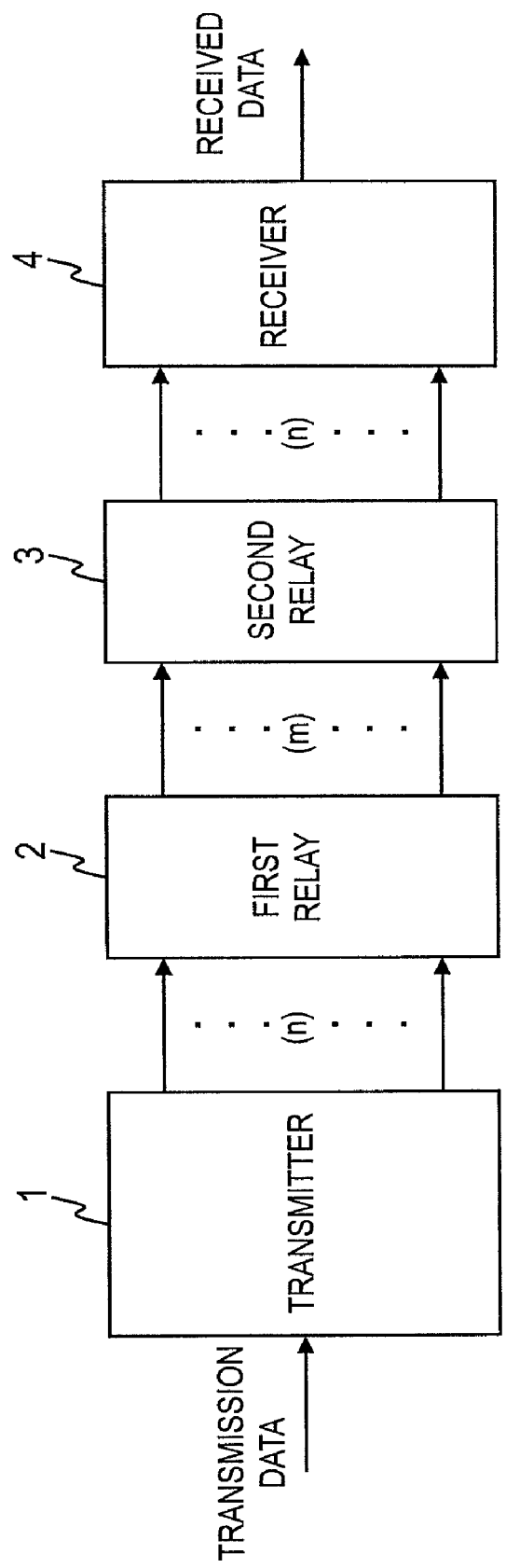
FIG. 1 is a block diagram illustrating a configuration of a data transmission system according to the embodiment of this invention.

FIG. 1 is a block diagram illustrating a configuration of a data transmission system according to the embodiment of this invention.

The data transmission system includes a transmitter 1, a first relay 2, a second relay 3, and a receiver 4.

To the transmitter 1, transmission data to be transmitted to the receiver 4 is input. The transmitter 1 divides the input transmission data for n channels (lanes), and outputs the divided data.

To the first relay 2, the transmitter 1 is coupled via the n lanes, and, from the n lanes, the data output by the transmitter 1 is input to the first relay 2. The first relay 2 outputs the input data to m lanes. It should be noted that n is an integer equal to or more than three, m is an integer equal to or more than two, n is larger than m, and n is different from n.

To the second relay 3, the first relay 2 is coupled via the m lanes, and, from the m lanes, the data output by the first relay 2 is input to the second relay 3. The second relay 3 outputs the input data to n lanes.

To the receiver 4, the second relay 3 is coupled via the n lanes, and, from the n lanes, the data output by the second relay 3 is input to the receiver 4. The receiver 4 outputs the input data as received data.

Figure 2:
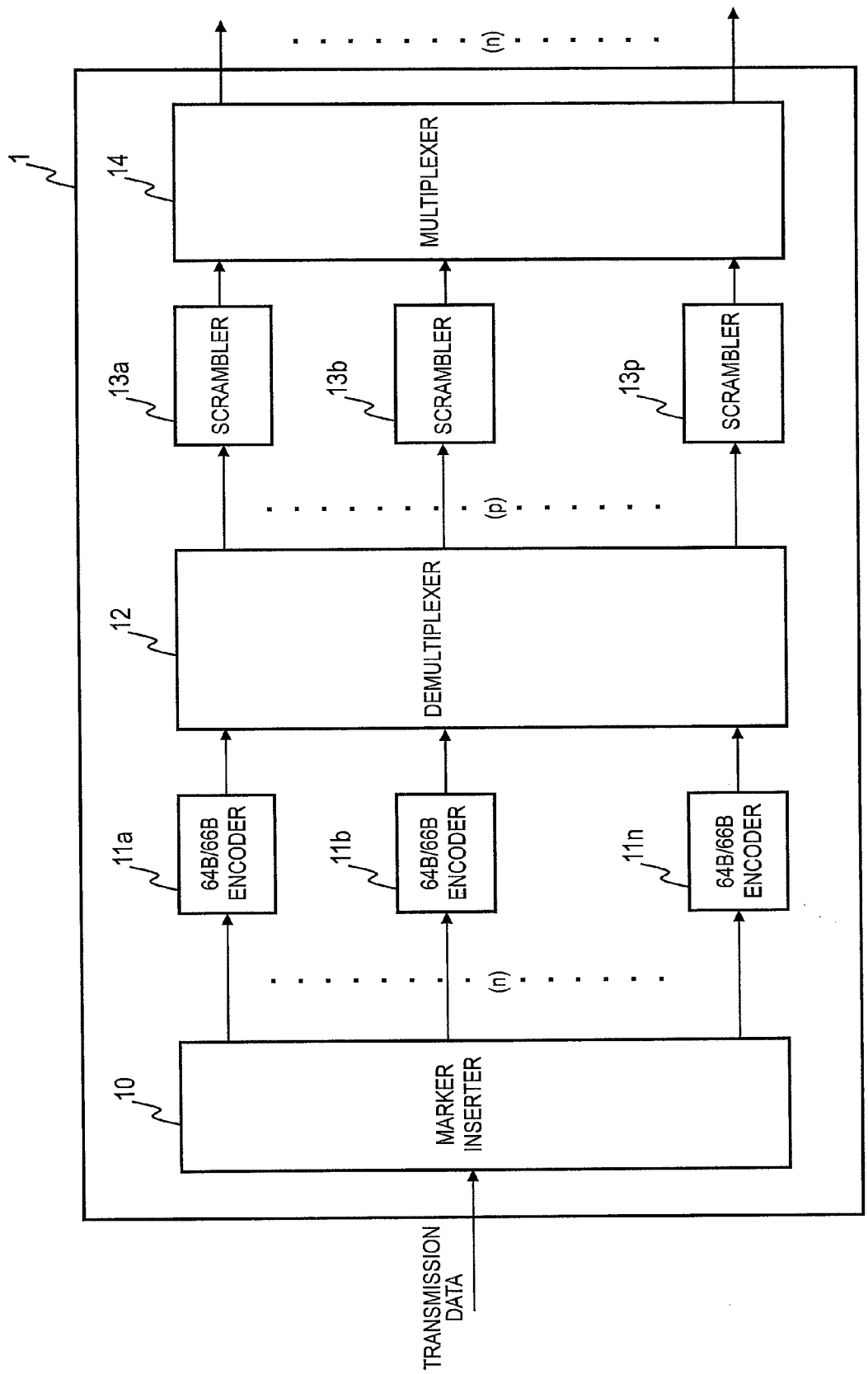
FIG. 2 is a block diagram of the transmitter according to the embodiment of this invention.

FIG. 2 is a block diagram of the transmitter 1 according to the embodiment of this invention.

The transmitter 1 includes a marker inserter 10, n 64B/66B encoders 11a to 11n, an n:p demultiplexer 12, p scramblers 13a to 13p, and a p:n multiplexer 14.

First, the transmission data is input to the marker inserter 10. The marker inserter 10 includes n outputs, and the input transmission data is output from the n outputs to the respective 64B/66B encoders 11a to 11n. Data pieces output from the respective 64B/66B encoders 11a to 11n are input from n inputs provided for the n:p demultiplexer 12 to the n:p demultiplexer 12. Data pieces input from the respective 64B/66B encoders 11a to 11n are output from p outputs provided for the n:p demultiplexer 12 to the scramblers 13a to 13p. It should be noted that p is the least common multiple n and m.

Data pieces output from the respective scramblers 13a to 13p are input from p inputs provided for the p:n multiplexer 14 to the p:n multiplexer 14. The data pieces input from the respective scramblers 13a to 13p are output from n outputs provided for the p:n multiplexer 14 to the first relay 2.

A detailed description is now given of the respective components of the transmitter 1.

First, a description is given of the marker inserter 10.

There is an idle span between data frames of the data sequence in the transmission data input to the transmitter 1. The idle span between the transmission of a certain data frame and the transmission of a next data frame is a period during which idle codes are output. The idle code is irrelevant to the transmission data, and is an invalid signal indicating a partition between data frames in the data sequence.

The marker inserter 10 inserts, using this idle span, a data pattern for correcting skews into the data frames constituting the transmission data. The data pattern for correcting skews is information indicating a lane to which a data frame is output from the transmitter 1 and a phase at which the data frame is output from the transmitter 1.

Then, the marker inserter 10 outputs the transmission data to which the data pattern for correcting skews have been inserted from the n (to simplify, the n is five hereinafter) outputs.

Figure 3:
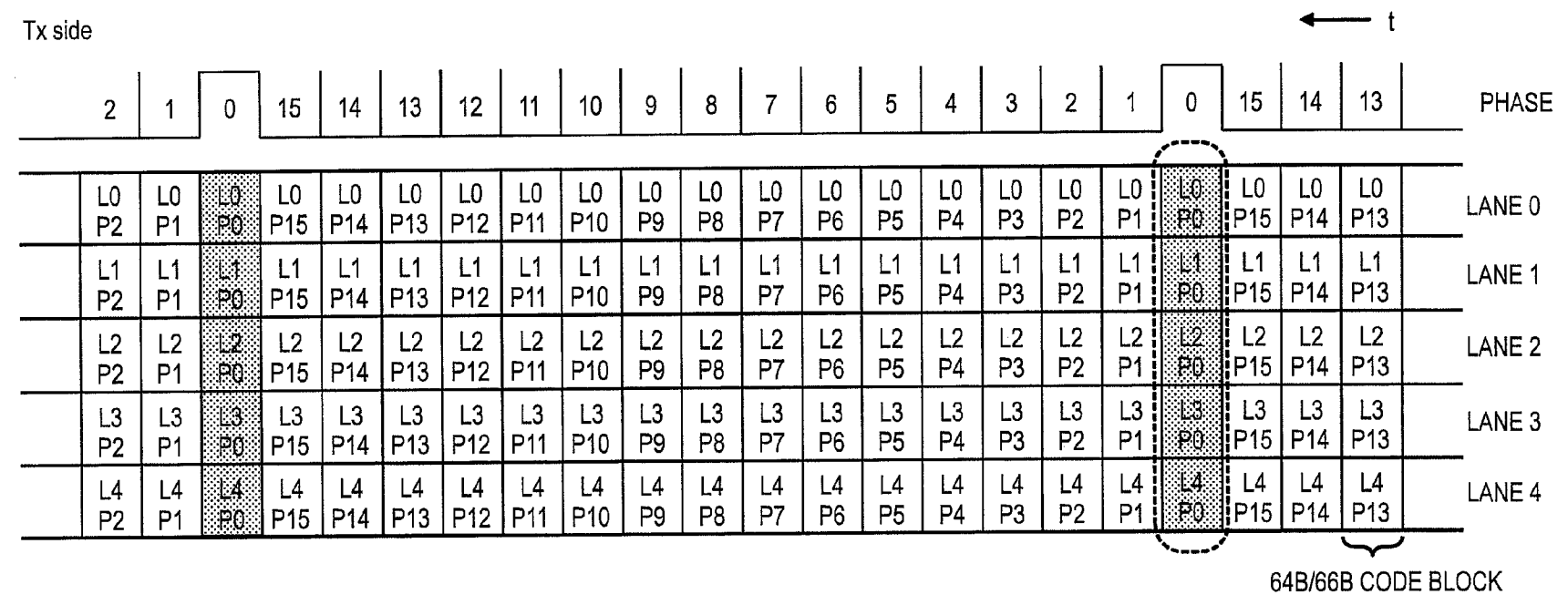

Referring to FIG. 3, a description is given of the data sequences to which the data pattern for correcting skews have been inserted by the marker inserter 10, and which are then output. FIG. 3 illustrates the data sequences output by the marker inserter 10 according to the embodiment of this invention.

The marker inserter 10 distributes the transmission data to data sequences corresponding to the five lanes (lanes 0 to 4), which are the outputs of the marker inserter 10, divides the distributed data sequences into data frames corresponding to sixteen phases (phases 0 to 15), and outputs the data sequences. It should be noted that the data pattern for correcting skews is the information of the lane to which a data frame is output and the phase of the data frame, and is contained in a 64B/66B code block constituted of eight characters.

For example, a data pattern for correcting skews corresponding to a data frame for the lane 0 and the phase 0 contains "L0" as information indicating the lane and "P0" as information indicating the phase.

Figure 4:
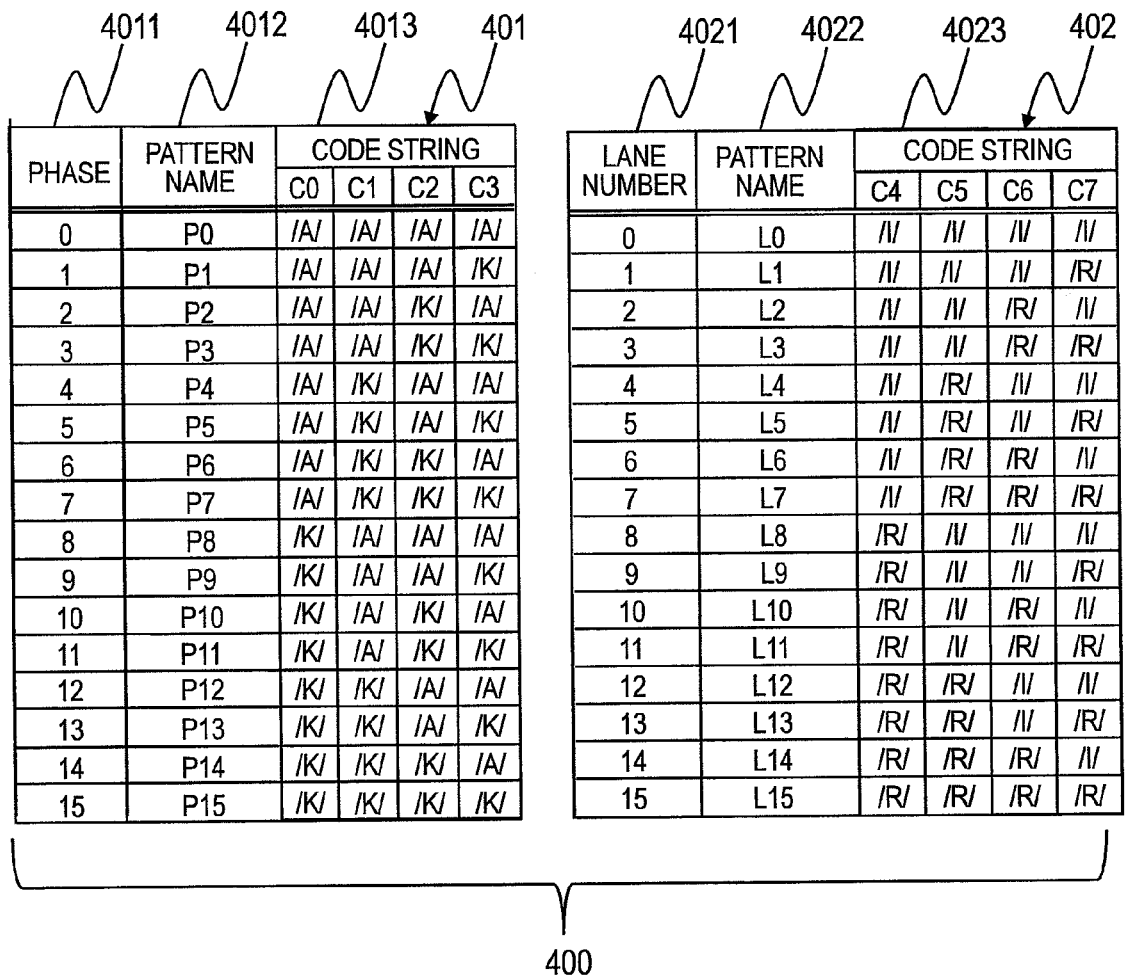
FIG. 4 is a translation tables for data pattern for correcting skews according to the embodiment of this invention.

The marker inserter 10 refers to a translation tables for data pattern for correcting skews 400 illustrated in FIG. 4, thereby mapping a data pattern for correcting skews to the 64B/66B code block.

FIG. 4 illustrates the translation tables for data pattern for correcting skews 400 according to the embodiment of this invention.

The translation tables for data pattern for correcting skews 400 include a phase translation table 401 and a lane number translation table 402.

The phase translation table 401 includes phases 4011, pattern names 4012, and code strings 4013.

To a phase 4011, the phase (0 to 15) of a data frame is registered. To a pattern name 4012, information indicating the phase (P0 to P15), which is contained in a data pattern for correcting skews, is registered.

To a code string 4013, an idle code string to which the information indicating the phase, which is contained in the data pattern for correcting skews, is translated is registered. The idle code string registered to the code string 4013 is constituted of two idle codes (/A/ and /K/) of the idle codes (/A/, /K/, /I/, and /R/) used for the 64B/66B code. The code string 4013 is used to translate the information indicating the phase, which is contained in the data pattern for correcting skews, to a four-bit binary number (the binary "0" is indicated by /A/, and the binary "1" is indicated by /K/).

The lane number translation table 402 includes lane numbers 4021, pattern names 4022, and code strings 4023.

To a lane number 4021, a lane number (0 to 15) of a data frame is registered. To a pattern name 4022, information indicating the lane (L0 to L15), which is contained in a data pattern for correcting skews, is registered.

To a code string 4023, an idle code string to which the information indicating the lane, which is contained in the data pattern for correcting skews, is translated is registered. The idle code string registered to the code string 4023 is constituted of two idle codes (/I/ and /R/) of the idle codes (/A/, /K/, /I/, and /R/) used for the 64B/66B code. The code string 4023 is used to translate the information indicating the lane, which is contained in the data pattern for correcting skews, to a four-bit binary number (the binary "0" is indicated by /I/, and the binary "1" is indicated by /R/).

For example, when the information indicating the phase, which is contained in a data pattern for correcting skews, is P0, and the information indicating the lane is L0, the eight-character locations (C0 to C7) of the 64B/66B code block are represented as /A/A/A/A/I/I/I/I.

The idle code strings of the information indicating the phase and the information indicating the lane only need to be mutually unique. Moreover, after converting the information indicating the phase and the information indicating the lane into four-bit gray codes, idle code strings may be assigned as in this embodiment.

A description is now given of the 64B/66B encoders 11a to 11n.

The 64B/66B encoders 11a to 11n translate the data input from the marker inserter 10 into a 64B/66B code based on a 64B/66B code translation table (not shown).

Specifically, the 64B/66B encoders 11a to 11n translate the eight eight-bit data pieces (total of 64 bits) and control bits (eight bits) accompanying the eight-bit data pieces input from the marker inserter 10 into 2-bit header and 64-bit coded data (total of 66 bits), and outputs the data to the n:p demultiplexer 12. It should be noted that the translation carried out by the 64B/66B encoders 11a to 11n does not include processing of scrambling the data portion. The scrambling processing is carried out by the scramblers 13a to 13p.

The n:p demultiplexer 12 rearranges the data frames constituting the input data sequences so that the inputs from the n 64B/66B encoders 11a to 11n are output from the p outputs. When it is necessary to increase the speed of the processing carried out by the transmitter 1, the n:p demultiplexer 12 is configured to carry out the rearrangement of the data frames in parallel. For example, this parallel processing is configured to take an input of n×32 bits, and to output p×32 bits.

The scramblers 13a to 13p carry out the scrambling processing used when data is coded into 64B/66B codes. For a standard 64B/66B code, a generator polynomial $G(X)=1+X^{39}+X^{58}$ is used for the scrambling processing.

The p:n multiplexer 14 carries out processing which is opposite to the processing carried out by the n:p demultiplexer 12. In other words, the p:n multiplexer 14 rearranges the data frames constituting the input data sequences so that the inputs from the p scramblers 13a to 13p are output from the n outputs.

Figure 5:
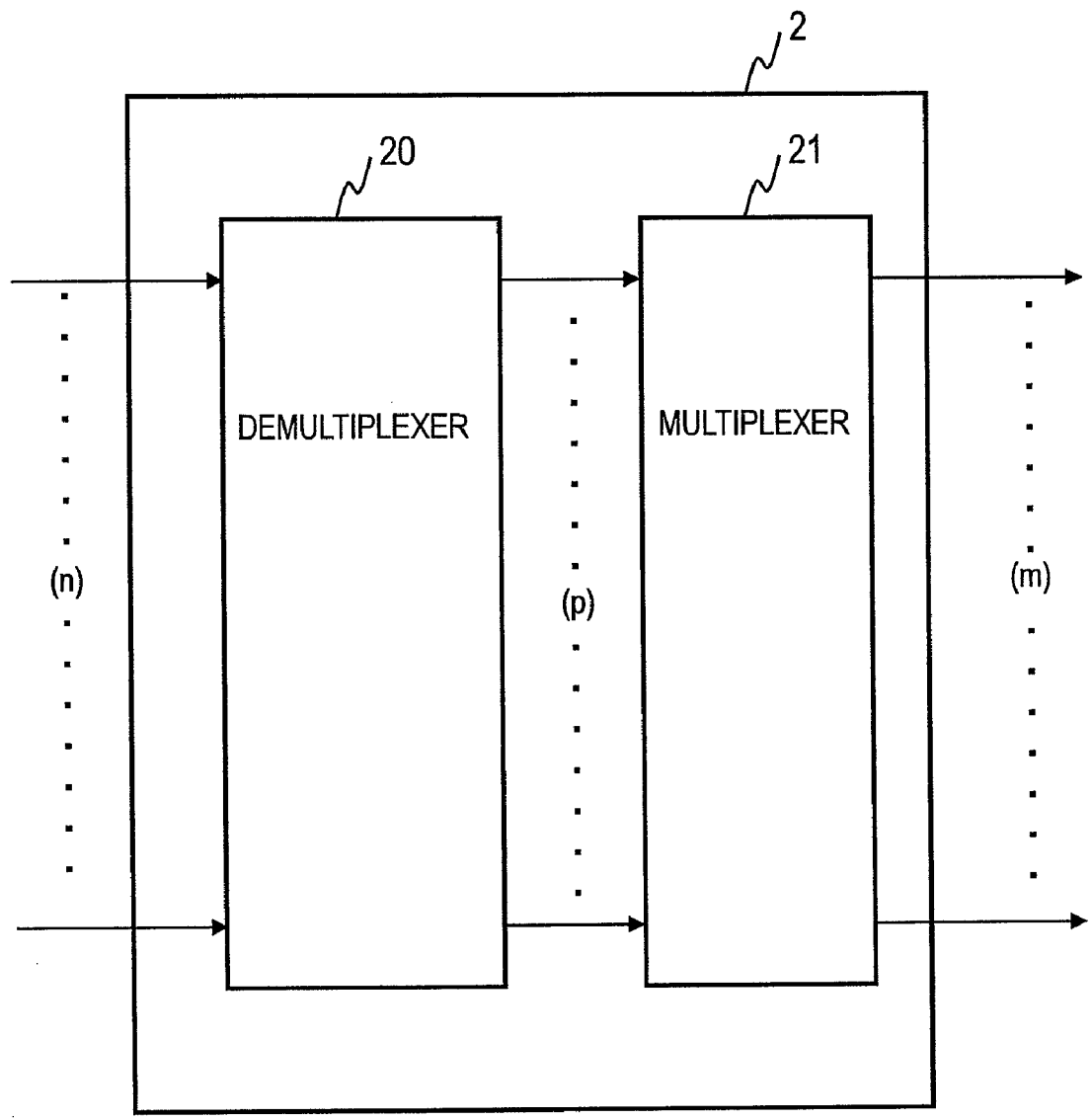
FIG. 5 is a block diagram of the first relay according to the embodiment of this invention.

Referring to FIG. 5, a description is now given of the first relay 2. FIG. 5 is a block diagram of the first relay 2 according to the embodiment of this invention.

The first relay 2 converts the number of lanes from n to m. The first relay 2 includes an n:p demultiplexer 20 and a p:m multiplexer 21.

The first relay 2 receives the data sequences transmitted by the transmitter 1 from n inputs provided for the n:p demultiplexer 20. The data input to the n:p demultiplexer 20 is output from p outputs provided for the n:p demultiplexer 20 to the p:m multiplexer 21. The data input to the p:m multiplexer 21 is output from m outputs provided for the p:m multiplexer 21 to the second relay 3.

The n:p demultiplexer 20 is configured as the n:p demultiplexer 12, and hence description thereof is omitted. The p:m multiplexer 21 rearranges the data frames constituting the input p data sequences so that the p data sequences are output from the m outputs.

Figure 6:
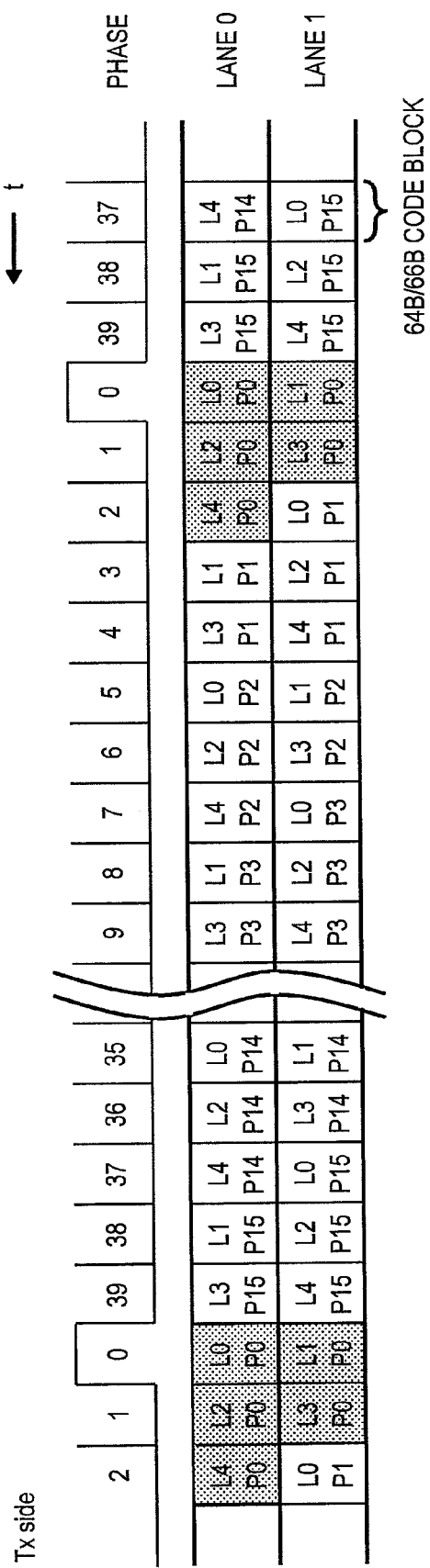
FIG. 6 is a data sequences output by the first relay according to the embodiment of this invention.

Referring to FIG. 6, a description is now given of the data sequences output by the first relay 2. FIG. 6 illustrates the data sequences output by the first relay 2 according to the embodiment of this invention.

The first relay 2 rearranges, as illustrated in FIG. 6, the data frames constituting the data sequences output from the five lanes as illustrated in FIG. 3 transmitted by the transmitter 1 so that the data sequences input from the five lanes can be output from the two lanes, and outputs the data sequences from the two lanes to the second relay 3.

Specifically, the first relay 2 rearranges a data frame of the lane 0 and the phase 0 (L0, P0) illustrated in FIG. 3 to a data frame of the lane 0 and the phase 0 illustrated in FIG. 6. Then, the first relay 2 rearranges a data frame of the lane 1 and the phase 0 (L1, P0) illustrated in FIG. 3 to a data frame of the lane 1 and the phase 0 illustrated in FIG. 6. Then, the first relay 2 rearranges a data frame of the lane 2 and the phase 0 (L2, P0) illustrated in FIG. 3 to a data frame of the lane 0 and the phase 1 illustrated in FIG. 6.

In this way, the first relay 2 sequentially rearranges the data frames constituting the data sequences output by the five lanes to the data sequences to be output from the two lanes.

Figure 7:
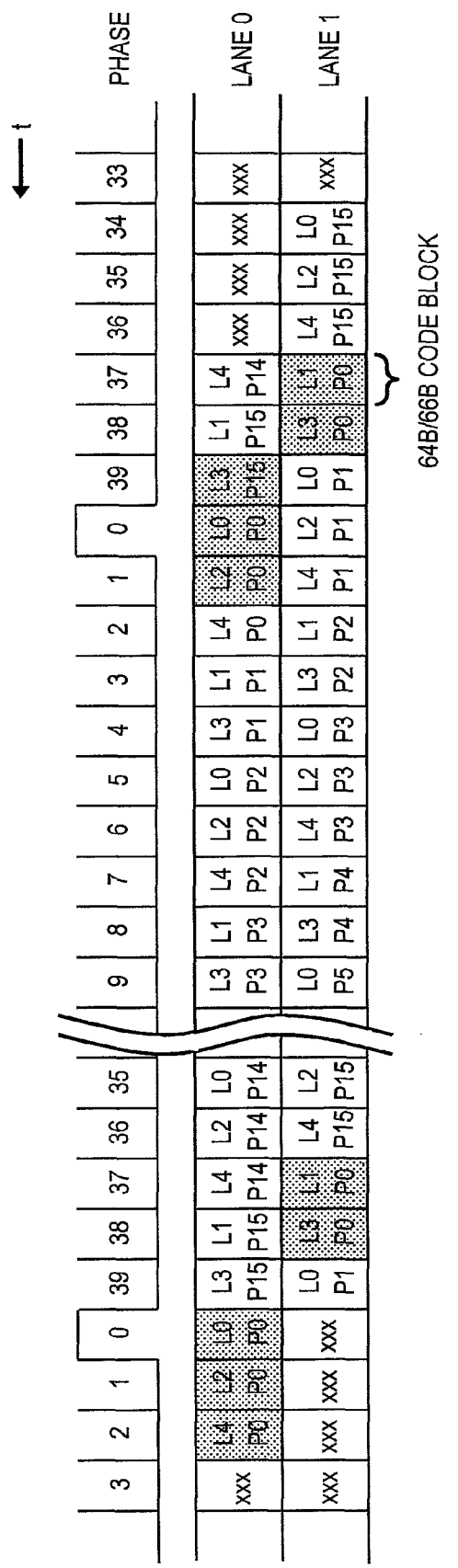
FIG. 7 is a data sequences received by the second relay according to the embodiment of this invention.

A skew is generated before the second relay 3 receives the data sequences transmitted by the first relay 2. Referring to FIG. 7, a description is now given of the data sequences received by the second relay 3. FIG. 7 describes the data sequences received by the second relay 3 according to the embodiment of this invention.

FIG. 7 illustrates data sequences in the case where the data sequence transmitted via the lane 1 by the first relay 2 reaches the second relay 3 earlier by a time corresponding to three codes than the data sequence transmitted via the lane 0.

Thus, as illustrated in FIG. 7, the phase of the data sequence in the lane 1 received by the second relay 3 is disaligned by three phases from the data sequence in the lane 1 transmitted by the first relay 2.

Figure 8:
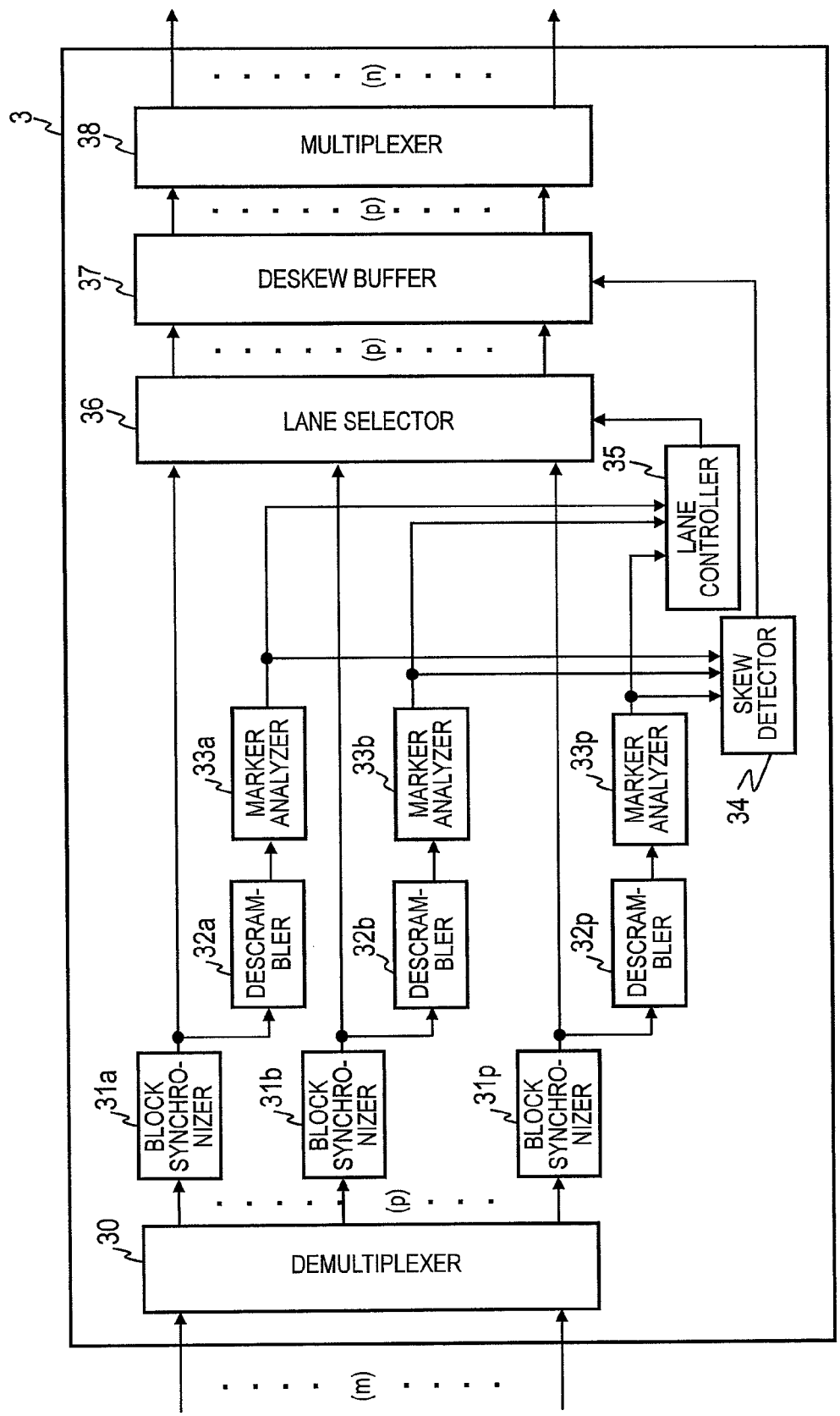
FIG. 8 is a block diagram of the second relay according to the embodiment of this invention.

Next, referring to FIG. 8, a description is given of the second relay 3. FIG. 8 is a block diagram of the second relay 3 according to the embodiment of this invention.

The second relay 3 converts the number of lanes from m to n. The second relay 3 includes an m:p demultiplexer 30, p block synchronizers 31a to 31p, p descramblers 32a to 32p, p marker analyzers 33a to 33p, a skew detector 34, a lane controller 35, a lane selector 36, a deskew buffer 37, and a p:n multiplexer 38.

The second relay 3 receives the data sequences transmitted by the first relay 2 from m inputs provided for the m:p demultiplexer 30. The data sequences input to the m:p demultiplexer 30 are output from p outputs provided for the m:p demultiplexer 30 to the respective block synchronizers 31a to 31p. The respective block synchronizers 31a to 31p output the data sequences to the respective descramblers 32a to 32p and the lane selector 36.

The respective descramblers 32a to 32p output the data sequences to the respective marker analyzers 33a to 33p. The respective marker analyzers 33a to 33p output the data sequences to the skew detector 34 and the lane controller 35.

The skew detector 34 outputs the data sequences to the deskew buffer 37. The lane controller 35 outputs the data sequences to the lane selector 36. The lane selector 36 outputs the data sequences from p outputs provided for the lane selector 36 to the deskew buffer 37. The deskew buffer 37 outputs the data sequences from p outputs provided for the deskew buffer 37 to the p:n multiplexer 38. The p:n multiplexer 38 outputs the data sequences from n outputs provided for the p:n multiplexer 38 to the receiver 4.

Next, a description is given of the respective components of the second relay 3.

The m:p demultiplexer 30 rearranges the data frames constituting the input m data sequences so that the m data sequences input from the first relay 2 are output from the p outputs. The data sequences in the two lanes received from the first relay 2 illustrated in FIG. 7 are rearranged by the m:p demultiplexer 30 into the data sequences in ten lanes illustrated in FIG. 9, and the rearranged data sequences in the ten lanes are output from the p outputs provided for the m:p demultiplexer 30.

Figure 9:
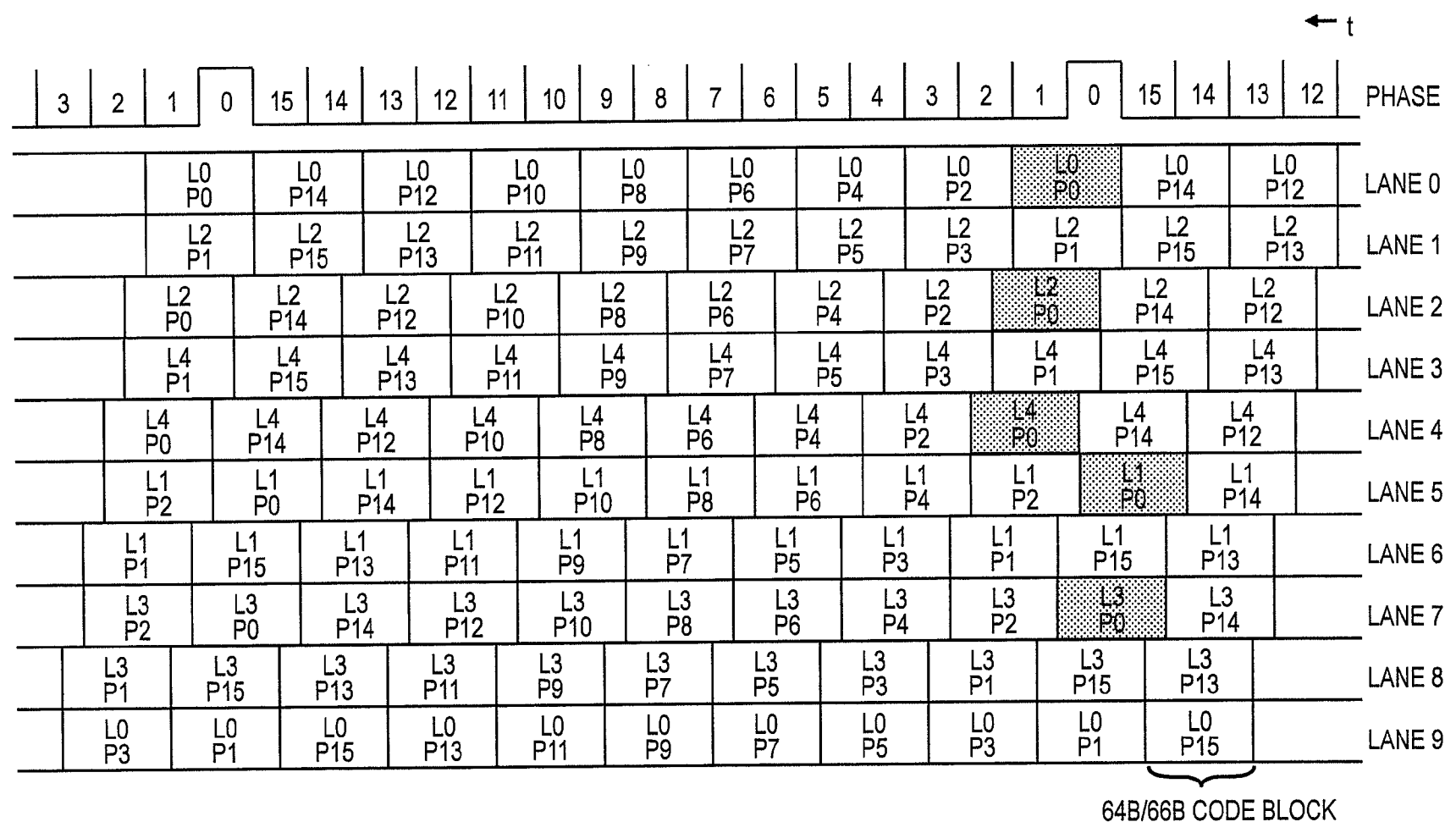

Referring to FIG. 9, a description is now given of the data sequences output from the m:p demultiplexer 30. FIG. 9 describes the data sequences output from the m:p demultiplexer 30 according to the embodiment of this invention.

A data frame of the lane 0 and the phase 0 (L0, P0) illustrated in FIG. 7 is rearranged to a data frame of the lane 0 and the phase 0 illustrated in FIG. 9. A data frame of the lane 1 and the phase 0 (L2, P1) illustrated in FIG. 7 is rearranged to a data frame of the lane 1 and the phase 0 illustrated in FIG. 9.

A data frame of the lane 0 and the phase 1 (L2, P0) illustrated in FIG. 7 is rearranged to a position disaligned by ⅜ phase from the lane 2 and phase 0 illustrated in FIG. 9. A description is given of a reason why the data frame of the lane 0 and the phase 1 (L2, P0) illustrated in FIG. 7 is disaligned by ⅜ phase from the phase 0.

In FIG. 7, the second relay 3 receives the data frame (L0, P0) via the lane 0, and, then, after the delay of one phase, receives the data frame (L2, P0). It should be noted that FIG. 7 illustrates 40 phases, and FIG. 9 illustrates 16 phases.

Therefore, the data received by the second relay 3 after the delay of one phase in FIG. 7 is disaligned by ⅜ phase in FIG. 9.

Moreover, a data frame of the lane 1 and the phase 1 (L4, P1) illustrated in FIG. 7 is rearranged to a position disaligned by ⅜ phase from the lane 3 and phase 0 illustrated in FIG. 9.

The m:p demultiplexer 30 rearranges, by repeating this arrangement, the data sequences in the two lanes illustrated in FIG. 7 to the data sequences in the ten lanes illustrated in FIG. 9.

The data sequences output by the m:p demultiplexer 30 illustrated in FIG. 9 are not arranged in an order of lane information of the data pattern for correcting skews contained in the rearranged data due to the skew. Moreover, the data in the lanes 0 and 1 are disaligned from the data in the lanes 6 to 9 by at least one phase. In other words, due to the skew, the lane and phase are disaligned.

The block synchronizers 31a to 31p detect a boundary of the 64B/66B code blocks by detecting the 2-bit header of the bit data constituting the 64B/66B coded data from the data frames constituting the data sequence. With respect to the data sequences output from the block synchronizers 31a to 31p, the respective components of the second relay 3 processes each 64B/66B code block as a unit.

The descramblers 32a to 32p descramble the scrambling carried out by the scramblers 13a to 13p of the transmitter 1. The descramblers 32a to 32p descramble the scrambling using the generator polynomial $G(X)=1+X^{39}+X^{58}$ used in the scrambler processing carried out by the scramblers 13a to 13p.

The marker analyzers 33a to 33p detect, from the descrambled data sequences, the data pattern for correcting skews. Then, the marker analyzers 33a to 33p identify the phases originally arranged upon the data transmission from the transmitter 1 based on the information indicating the phase contained in the detected data pattern for correcting skews, and identify the lanes originally arranged upon the data transmission from the transmitter 1 based on the information indicating the lane contained in the detected data pattern for correcting skews.

The lane controller 35, based on the lanes identified by the marker analyzers 33, controls the lane selector 36 to rearrange the data sequences disposed on lanes different from the lanes originally disposed upon the transmission from the transmitter 1 to the original lanes upon the transmission from the transmitter 1.

The lane selector 36 is a set of simple selectors provided with the p inputs and the p outputs.

Figure 10:
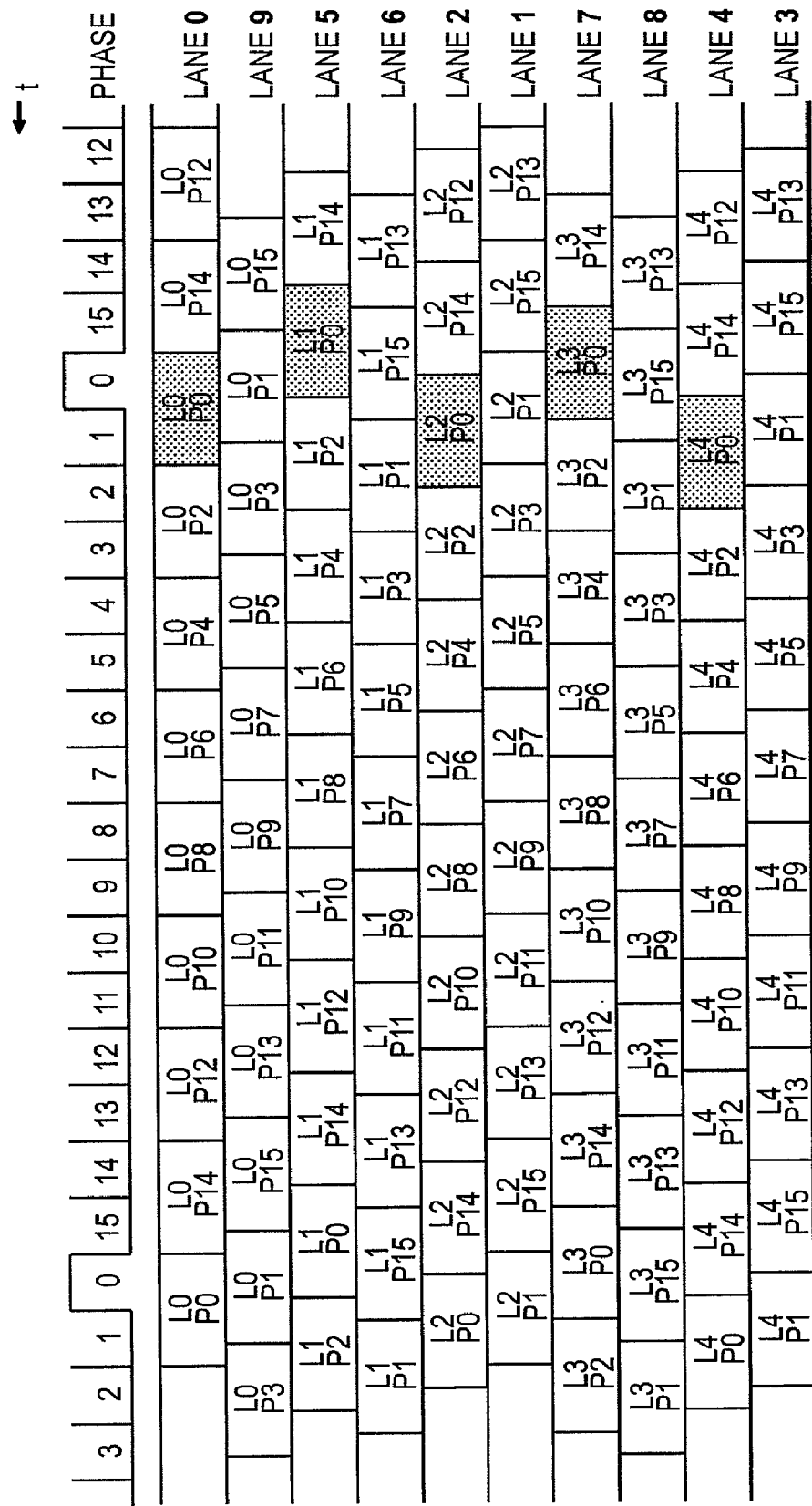
FIG. 10 is a data sequences output from the lane selector according to the embodiment of this invention.

Referring to FIG. 10, a description is now given of the data sequences output from the lane selector 36. FIG. 10 describes the data sequences output from the lane selector 36 according to the embodiment of this invention.

The lane controller 35 controls the lane selector 36 to rearrange the lanes according to the information indicating the lane contained in the data pattern for correcting skews.

Specifically, in FIG. 9, lanes for which the information indicating the lane contained in the data pattern for correcting skews is L0 are the lanes 0 and 9, and thus the data sequence in the lane 9 is rearranged directly below the data sequence in the lane 0.

Moreover, in FIG. 9, the lanes for which the information indicating the lane contained in the data pattern for correcting skews is L1 are the lanes 5 and 6. Moreover, the information indicating the phase contained in the data pattern for correcting skews for the lane 5 indicates P0, P2, P4, . . . , and the information indicating the phase contained in the data pattern for correcting skews for the lane 6 indicates P1, P3, P5, . . . . In other words, the phases indicated by the information indicating the phase for the lane 5 lead the phases indicated by the information indicating the phase for the lane 6.

Thus, the data sequence in the lane 5 is rearranged directly below the data sequence in the rearranged lane 9, and the data sequence in the lane 6 is rearranged directly below the data sequence in the rearranged lane 5.

Moreover, in FIG. 9, the lanes for which the information indicating the lane contained in the data pattern for correcting skews is L2 are the lanes 1 and 2. Moreover, the information indicating the phase contained in the data pattern for correcting skews for the lane 1 indicates P1, P3, P5, . . . , and the information indicating the phase contained in the data pattern for correcting skews for the lane 2 indicates P0, P2, P4, . . . . The data sequence in the lane 2 is rearranged directly below the rearranged lane 6, and the data sequence in the lane 1 is rearranged directly below the rearranged lane 2.

Moreover, in FIG. 9, the lanes for which the information indicating the lane contained in the data pattern for correcting skews is L3 are the lanes 7 and 8. Moreover, the information indicating the phase contained in the data pattern for correcting skews for the lane 7 indicates P0, P2, P4, . . . , and the information indicating the phase contained in the data pattern for correcting skews for the lane 8 indicates P1, P3, P5, . . . . The data sequence in the lane 7 is rearranged directly below the rearranged lane 1, and the data sequence in the lane 8 is rearranged directly below the rearranged lane 7.

Moreover, in FIG. 9, the lanes for which the information indicating the lane contained in the data pattern for correcting skews is L4 are the lanes 3 and 4. Moreover, the information indicating the phase contained in the data pattern for correcting skews for the lane 3 indicates P1, P3, P5, . . . , and the information indicating the phase contained in the data pattern for correcting skews for the lane 4 indicates P0, P2, P4, . . . . The data sequence in the lane 4 is rearranged directly below the rearranged lane 8, and the data sequence in the lane 3 is rearranged directly below the rearranged lane 4.

As a result, the lane controller 35 can correct, based on the information indicating the lane contained in the data pattern for correcting skews, disalignment in lane due to a skew.

However, the data sequences output from the lane selector 36 illustrated in FIG. 10 are corrected in terms of the lane disalignment, but not in terms of the phase disalignment.

The skew detector 34 controls, based on the phase identified by the marker analyzers 33a to 33p, the deskew buffer 37 to correct the disalignment in phase.

Specifically, the skew detector 34 detects data frames for which the information indicating the phase contained in the data pattern for correcting skews is P0 or P1 in FIG. 10. Then, the skew detector 34 detects, of the detected data frame for which the information indicating the phase is P0 or P1, a data frame which has been output last from the marker analyzers 33a to 33p (data frame containing L1 and P0 in the lane 5 illustrated in FIG. 10). It should be noted that the data frame output last from the marker analyzers 33a to 33p is a data frame received last by the second relay 3.

Then, the skew detector 34 calculates phase differences between the detected data frame which has been output last from the marker analyzers 33a to 33p and the respective data frames for which the information indicating the phase is P0 or P1. Then, the skew detector 34 controls the deskew buffer 37 so that the deskew buffer 37 outputs the data sequences in the respective lanes after buffering for a period corresponding to the respective calculated phase differences.

As a result, the skew detector 34 can correct, based on the information indicating the phase contained in the data pattern for correcting skews, disalignment in phase due to a skew.

Referring to FIG. 11, a description is now given of the data sequences output from the deskew buffer 37. FIG. 11 describes the data sequences output from the deskew buffer 37 according to the embodiment of this invention.

The deskew buffer 37 outputs the data sequences in the respective lanes aligned to the data sequence which has been output last from the marker analyzers 33a to 33p, and thus the disalignment in phase of the respective lanes are corrected as illustrated in FIG. 11.

The p:n multiplexer 38, similarly to the p:n multiplexer 14 of the transmitter 1 illustrated in FIG. 2, rearranges the p data sequences output from the deskew buffer 37 to n data sequences. The n data sequences output from the p:n multiplexer 38 to the receiver 4 is the same as the data sequences output from the transmitter 1 to the first relay 2 illustrated in FIG. 3.

Figure 12:
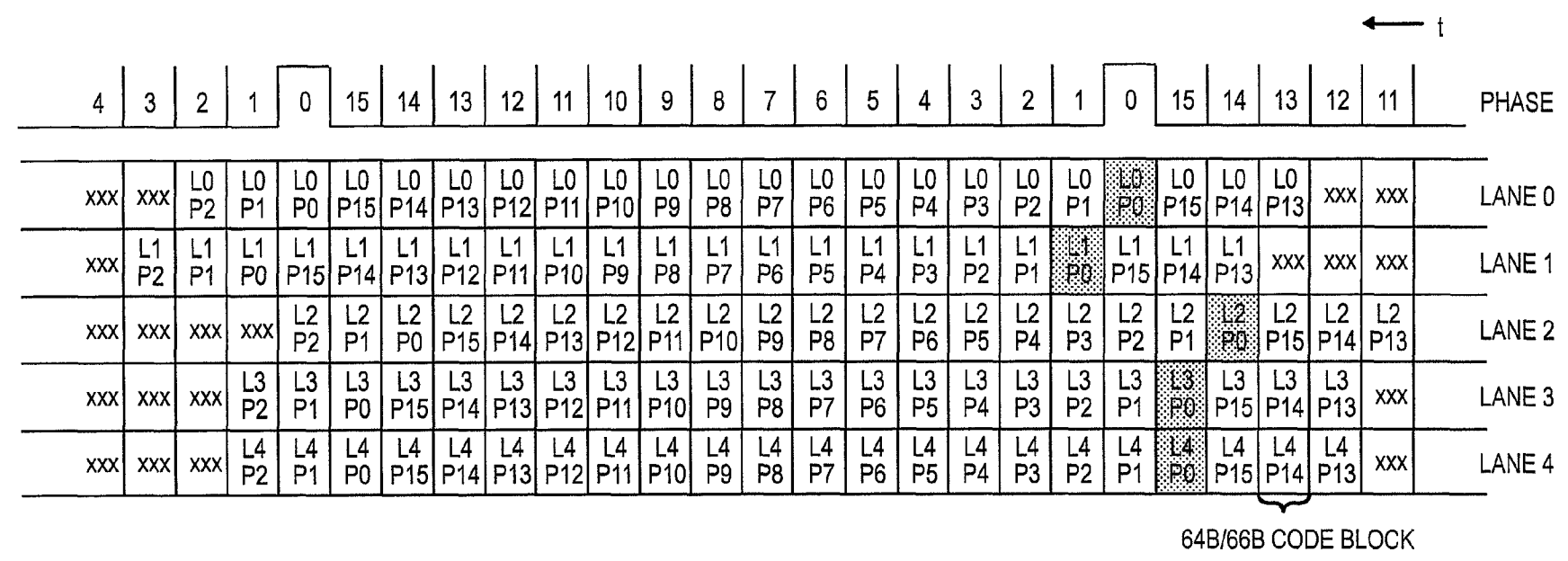

On this occasion, a skew is generated before the receiver 4 receives the data transmitted by the second relay 3. Referring to FIG. 12, a description is now given of the data sequences received by the receiver 4. FIG. 12 describes the data sequences received by the receiver 4 according to the embodiment of this invention.

In FIG. 12, with respect to the data sequence received via the lane 2, a disalignment of two phases is generated by the skew on the data sequence received via the lane 0, a disalignment of three phases is generated by the skew on the data sequence received via the lane 1, a disalignment of one phase is generated by the skew on the data sequence received via the lane 3, and a disalignment of one phase is generated by the skew on the data sequence received via the lane 4.

Figure 13:
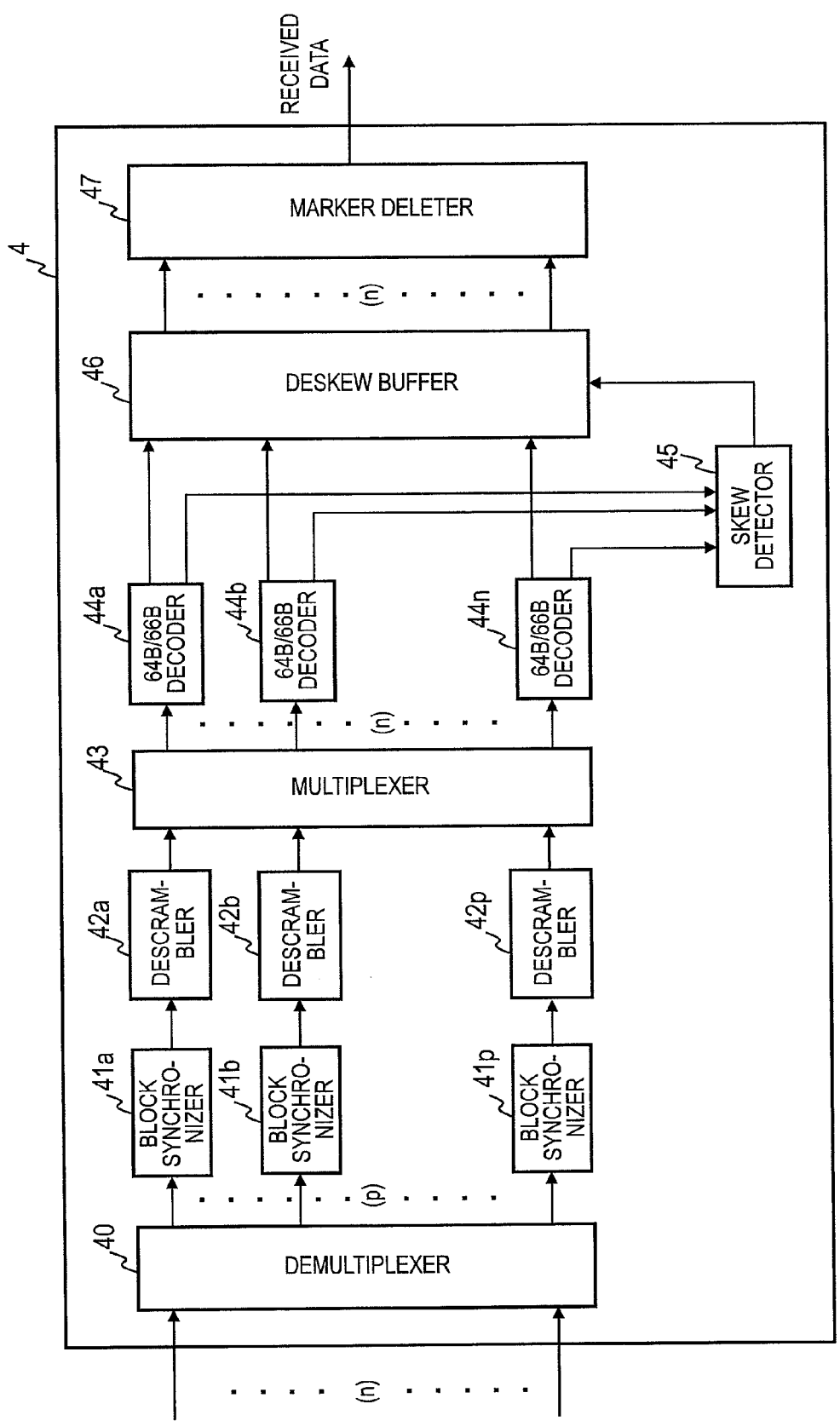
FIG. 13 is a block diagram of the receiver according to the embodiment of this invention.

Next, referring to FIG. 13, a description is given of the receiver 4. FIG. 13 is a block diagram of the receiver 4 according to the embodiment of this invention.

The receiver 4 includes an n:p demultiplexer 40, p block synchronizers 41a to 41p, p descramblers 42a to 42p, a p:n multiplexer 43, n 64B/66B decoders 44a to 44n, a skew detector 45, a deskew buffer 46, and a marker deleter 47.

The receiver 4 receives the data sequences transmitted by the second relay 3 from n inputs provided for the n:p demultiplexer 40. The data sequences input to the n:p demultiplexer 40 are output from p outputs provided for the n:p demultiplexer 40 to the respective block synchronizers 41a to 41p. The respective block synchronizers 41a to 41p output the data sequences to the respective descramblers 42a to 42p.

The respective descramblers 42a to 42p output the data sequences to the p:n multiplexer 43. The p:n multiplexer 43 outputs the data sequences from n outputs provided for the p:n multiplexer 43 to the respective 64B/66B decoders 44a to 44n.

The respective 64B/66B decoders 44a to 44n output the data sequences to the skew detector 45 and the deskew buffer 46. The skew detector 45 outputs the data sequences to the deskew buffer 46. The deskew buffer 46 outputs the data sequences from n outputs provided for the deskew buffer 46 to the marker deleter 47. The marker deleter 47 outputs the input data sequences as the received data to the outside of the receiver 4.

The n:p demultiplexer 40 is configured the same as the n:p demultiplexer 12 of the transmitter 1 illustrated in FIG. 2, and hence description thereof is omitted. The block synchronizers 41a to 41p are configured the same as the block synchronizers 31a to 31p of the second relay 3 illustrated in FIG. 8, and hence description thereof is omitted. The descramblers 42a to 42p are configured the same as the descramblers 32a to 32p of the second relay 3 illustrated in FIG. 8, and hence description thereof is omitted. The p:n multiplexer 43 is configured the same as the p:n multiplexer 14 of the transmitter 1 illustrated in FIG. 2, and hence description thereof is omitted.

The 64B/66B decoders 44a to 44n decode the data sequences coded by the n 64B/66B encoders 11a to 11n illustrated in FIG. 2 according to the 64B/66B coding based on a 64B/66B code translation table (not shown).

The skew detector 45 is configured the same as the skew detector 34 of the second relay 3 illustrated in FIG. 8, and hence description thereof is omitted. The deskew buffer 46 is configured the same as the deskew buffer 37 of the second relay 3 illustrated in FIG. 8, and hence description thereof is omitted.

The marker deleter 47 converts the data pattern for correcting skews inserted by the marker inserter 10 of the transmitter 1 illustrated in FIG. 2 into the original idle codes. The data output from the marker deleter 47 is the same as the transmission data input to the transmitter 1.

For a connection path along the transmitter 1, the first relay 2, the second relay 3, and the receiver 4, high-speed serial transmission is generally used. In this case, a parallel/serial converter is used for the inputs of the respective devices, and a serial/parallel converter is used for the outputs of the respective devices, but they are omitted for the sake of description in this embodiment.

According to this embodiment, the number of the lanes via which the receiver 4 receives the data is the same as the number of the lanes via which the transmitter 1 transmits the data, and hence a skew generated between the second relay 3 and the receiver 4 does not cause disalignment in phase.

Specifically, the n data sequences input to the receiver 4 are rearranged into the p (common multiple n) data sequences, and the rearranged p data sequences are rearranged into the n data sequences.

When the n data sequences input to the receiver 4 are rearranged into the p data sequences, and even when disalignment in phase are generated in the rearranged p data sequences, the p data steams in which the disalignment in phase are generated are rearranged into the n data sequences, and hence disalignment in phase are not generated.

Disalignment in phase are not generated in the receiver 4 according to this embodiment, and hence the receiver 4 does not need to correct disalignment in phase. Therefore, the receiver 4 according to this embodiment does not include the marker analyzers 33a to 33p, the lane controller 35, and the lane selector 36 which are provided for the second relay 3.

However, when the number of the lanes via which the receiver 4 receives the data is different from the number of the lanes via which the transmitter 1 transmits the data, a skew generated between the second relay 3 and the receiver 4 causes disalignment in phase.

Specifically, when the number of the lanes via which the receiver 4 receives the data is x, x data sequences are rearranged into the p data sequences. Then, the rearranged p data sequences are rearranged into the n data sequences while a skew is being generated, and thus the rearranged n data sequences are not the same n data sequences transmitted from the transmitter 1 due to disalignment in phase.

Therefore, as in the second relay 3, the receiver 4 needs to correct the disalignment in phase before the p data sequences are rearranged into the n data sequences.

Specifically, the receiver 4 needs to include p marker analyzers to which the data sequences are input from the descramblers 42a to 42p, a lane controller to which the data sequences are input from the p marker analyzers, and a lane selector to which the data sequences are input from the lane controller and p block synchronizers 41a to 41p. It should be noted that the data sequences input from the lane selector are output to the multiplexer 43.

This invention relates to the communication interface and the transmission circuit, and can be applied to network devices such as routers, switches, transmission devices, media converters, repeaters, and gateways.

While the present invention has been described in detail and pictorially in the accompanying drawings, the present invention is not limited to such detail but covers various obvious modifications and equivalent arrangements, which fall within the purview of the appended claims.

What is claimed is:

1. A transmission system, comprising:
a transmitter;
a relay; and
a receiver,
the transmitter for receiving data to be transmitted to the receiver,
the relay for transmitting the data transmitted by the transmitter to the receiver,
the receiver for receiving the data transmitted by the relay, wherein:
the transmitter and the relay are coupled by a first transmission line, and the relay and the receiver are coupled by a second transmission line;
the first transmission line includes a plurality of channels;
the second transmission line includes a plurality of channels different in number from the plurality of channels included in the first transmission line;
the transmitter is configured to:
distribute the data to be transmitted to data sequences corresponding to a number of the plurality of channels included in the first transmission line to insert into the data sequences channel information indicating a channel to which the distributed data sequence is to be output; and
transmit the data to the relay by outputting the distributed data sequences from the plurality of channels included in the first transmission line to the relay;
the relay is configured to:
detect the channel information inserted into the data sequences received from the plurality of channels included in the first transmission line;
correct, based on the detected channel information, disalignment in an order of arrival of the data sequences received via the plurality of channels, the disalignment being generated by differences in arrival time of the data sequences among the plurality of channels;
distribute the received data sequences to data sequences corresponding to a number of the plurality of channels included in the second transmission line; and
transmit the data to the receiver by outputting the distributed data sequences from the plurality of channels included in the second transmission line to the receiver; and
the receiver is configured to:
detect the channel information inserted into the data sequences received from the plurality of channels included in the second transmission line;
correct, based on the detected channel information, disalignment in an order of arrival of the data sequences received via the plurality of channels, the disalignment being generated by differences in arrival time of the data sequences among the plurality of channels; and
distribute the received data sequences to data sequences corresponding to the number of the plurality of channels included in the first transmission line used by the transmitter for transmitting the data.

2. The transmission system according to claim 1, wherein:
the transmitter is further configured to:
insert the channel information into the distributed data sequences corresponding to the number of the plurality of channels included in the first transmission line;
further distribute the distributed data sequences corresponding to the number of the plurality of channels included in the first transmission line to data sequences corresponding to a common multiple of the number of the plurality of channels included in the first transmission line and the number of the plurality of channels included in the second transmission line;
execute scrambling processing for the distributed data sequences corresponding to the common multiple;
distribute the distributed data sequences corresponding to the common multiple to the data sequences corresponding to the number of the plurality of channels included in the first transmission line; and
transmit the data to the relay by outputting the distributed data sequences corresponding to the number of the plurality of channels included in the first transmission line from the plurality of channels included in the first transmission line to the relay;
the relay is further configured to:
further distribute the distributed data sequences corresponding to the number of the plurality of channels included in the first transmission line, which are received from the plurality of channels included in the first transmission line, to data sequences corresponding to the common multiple;
descramble the distributed data sequences corresponding to the common multiple;
detect the channel information from the descrambled data sequences;
correct, by realigning the distributed data sequences corresponding to the common multiple according to an order of channels indicated by the detected channel information, the disalignment in the order of arrival of the data sequences received via the plurality of channels, the disalignment being generated by the differences in arrival time; and
transmit the data to the receiver by distributing the distributed data sequences corresponding to the common multiple to the data sequences corresponding to the number of the plurality of channels included in the second transmission line, and outputting the distributed data sequences from the plurality of channels included in the second transmission line to the receiver; and the receiver is further configured to:

further distribute the distributed data sequences corresponding to the number of the plurality of channels included in the second transmission line, which are received from the plurality of channels included in the second transmission line, to data sequences corresponding to the common multiple;

descramble the distributed data sequences corresponding to the common multiple;

detect the channel information from the descrambled data sequences;

correct, by realigning the distributed data sequences corresponding to the common multiple according to the order of channels indicated by the detected channel information, the disalignment in the order of arrival of the data sequences received via the plurality of channels, the disalignment being generated by the differences in arrival time; and distribute the distributed data sequences corresponding to the common multiple to the data sequences corresponding to the number of the plurality of channels included in the first transmission line.

3. The transmission system according to claim 1, wherein:

the transmitter is further configured to insert phase information indicating a phase of a clock of the transmitter in a case where a plurality of data frames included in the distributed data sequences corresponding to the number of the plurality of channels included in the first transmission line are output, into the plurality of data frames;

the relay is further configured to:

detect the phase information from the plurality of data frames included in the data sequences received from the plurality of channels included in the first transmission line; and correct, based on the detected phase information, disalignment in a phase of the plurality of data frames included in the data sequences received from the plurality of channels included in the first transmission line, the disalignment being generated by differences in arrival time of the data sequences among the plurality of channels included in the first transmission line; and the receiver is further configured to:

detect the phase information from the plurality of data frames included in the data sequences received from the plurality of channels included in the second transmission line; and correct, based on the detected phase information, disalignment in a phase of the plurality of data frames included in the data sequences received from the plurality of channels included in the second transmission line, the disalignment being generated by differences in arrival time of the data sequences among the plurality of channels included in the second transmission line.

4. The transmission system according to claim 3, wherein:

the relay is further configured to:

identify, based on the detected phase information, data frames indicating a predetermined phase from the data sequences received via the plurality of channels included in the first transmission line;

detect, from the identified data frames indicating the predetermined phase, a data frame received last due to the differences in arrival time of the data sequences among the plurality of channels included in the first transmission line;

calculate differences in arrival time between the detected data frame received last and the respective identified data frames indicating the predetermined phase; and correct the disalignment in the phase of the plurality of data frames included in the data sequences received from the plurality of channels included in the first transmission line by delaying the respective identified data frames indicating the predetermined phase by the calculated differences in arrival time, and outputting the delayed data frames to the receiver; and the receiver is further configured to:

identify, based on the detected phase information, data frames indicating a predetermined phase from the data sequences received via the plurality of channels included in the second transmission line;

detect, from the identified data frames indicating the predetermined phase, a data frame received last due to the differences in arrival time of the data sequences among the plurality of channels included in the second transmission line;

calculate differences in arrival time between the detected data frame received last and the respective identified data frames indicating the predetermined phase;

delay the respective identified data frames indicating the predetermined phase by the calculated differences in arrival time; and distribute the delayed data frames to the data sequences corresponding to the number of the plurality of channels included in the first transmission line used by the transmitter for transmitting the data.

5. The transmission system according to claim 3, wherein the transmitter is further configured to insert the channel information and the phase information in an idle time of the plurality of data frames included in the distributed data sequences corresponding to the number of the plurality of channels included in the first transmission line.

6. A transmission method in a transmission system comprising:

a transmitter;

a relay; and a receiver, the transmitter for receiving data to be transmitted to the receiver, the relay for transmitting the data transmitted by the transmitter to the receiver, the receiver for receiving the data transmitted by the relay, the transmitter and the relay being coupled by a first transmission line, and the relay and the receiver being coupled by a second transmission line, the first transmission line including a plurality of channels, the second transmission line including a plurality of channels different in number from the plurality of channels included in the first transmission line, the transmission method, in which the data is transmitted from the transmitter to the receiver, comprising the steps of:

distributing, by the transmitter, the data to be transmitted to data sequences corresponding to a number of the plurality of channels included in the first transmission line to insert into the data sequences channel information indicating a channel to which the distributed data sequence is to be output;

transmitting, by the transmitter, the data to the relay by outputting the distributed data sequences from the plurality of channels included in the first transmission line to the relay;

detecting, by the relay, the channel information inserted into the data sequences received from the plurality of channels included in the first transmission line;

correcting, by the relay, based on the detected channel information, disalignment in an order of arrival of the data sequences received via the plurality of channels, the disalignment being generated by differences in arrival time of the data sequences among the plurality of channels;

distributing, by the relay, the received data sequences to data sequences corresponding to a number of the plurality of channels included in the second transmission line;

transmitting, by the relay, the data to the receiver by outputting the distributed data sequences from the plurality of channels included in the second transmission line to the receiver;

detecting, by the receiver, the channel information inserted into the data sequences received from the plurality of channels included in the second transmission line;

correcting, by the receiver, based on the detected channel information, disalignment in an order of arrival of the data sequences received via the plurality of channels, the disalignment being generated by differences in arrival time of the data sequences among the plurality of channels; and distributing, by the receiver, the received data sequences to data sequences corresponding to the number of the plurality of channels included in the first transmission line used in the transmitting, by the transmitter, the data.

7. The transmission method according to claim 6, further comprising the steps of:

inserting, by the transmitter, the channel information into the distributed data sequences corresponding to the number of the plurality of channels included in the first transmission line;

further distributing, by the transmitter, the distributed data sequences corresponding to the number of the plurality of channels included in the first transmission line to data sequences corresponding to a common multiple of the number of the plurality of channels included in the first transmission line and the number of the plurality of channels included in the second transmission line;

executing, by the transmitter, scrambling processing for the distributed data sequences corresponding to the common multiple;

distributing, by the transmitter, the distributed data sequences corresponding to the common multiple to the data sequences corresponding to the number of the plurality of channels included in the first transmission line;

transmitting, by the transmitter, the data to the relay by outputting the distributed data sequences corresponding to the number of the plurality of channels included in the first transmission line from the plurality of channels included in the first transmission line to the relay;

further distributing, by the relay, the distributed data sequences corresponding to the number of the plurality of channels included in the first transmission line, which are received from the plurality of channels included in the first transmission line, to data sequences corresponding to the common multiple;

descrambling, by the relay, the distributed data sequences corresponding to the common multiple;

detecting, by the relay, the channel information from the descrambled data sequences;

correcting, by the relay, by realigning the distributed data sequences corresponding to the common multiple according to an order of channels indicated by the detected channel information, the disalignment in the order of arrival of the data sequences received via the plurality of channels, the disalignment being generated by the differences in arrival time;

transmitting, by the relay, the data to the receiver by distributing the distributed data sequences corresponding to the common multiple to the data sequences corresponding to the number of the plurality of channels included in the second transmission line, and outputting the distributed data sequences from the plurality of channels included in the second transmission line to the receiver;

further distributing, by the receiver, the distributed data sequences corresponding to the number of the plurality of channels included in the second transmission line, which are received from the plurality of channels included in the second transmission line, to data sequences corresponding to the common multiple;

descrambling, by the receiver, the distributed data sequences corresponding to the common multiple;

detecting, by the receiver, the channel information from the descrambled data sequences;

correcting, by the receiver, by realigning the distributed data sequences corresponding to the common multiple according to the order of channels indicated by the detected channel information, the disalignment in the order of arrival of the data sequences received via the plurality of channels, the disalignment being generated by the differences in arrival time; and distributing, by the receiver, the distributed data sequences corresponding to the common multiple to the data sequences corresponding to the number of the plurality of channels included in the first transmission line.

8. The transmission method according to claim 6, further comprising the steps of:

inserting, by the transmitter, phase information indicating a phase of a clock of the transmitter in a case where a plurality of data frames included in the distributed data sequences corresponding to the number of the plurality of channels included in the first transmission line are output, into the plurality of data frames;

detecting, by the relay, the phase information from the plurality of data frames included in the data sequences received from the plurality of channels included in the first transmission line;

correcting, by the relay, based on the detected phase information, disalignment in a phase of the plurality of data frames included in the data sequences received from the plurality of channels included in the first transmission line, the disalignment being generated by differences in arrival time of the data sequences among the plurality of channels included in the first transmission line;

detecting, by the receiver, the phase information from the plurality of data frames included in the data sequences received from the plurality of channels included in the second transmission line; and correcting, by the receiver, based on the detected phase information, disalignment in a phase of the plurality of data frames included in the data sequences received from the plurality of channels included in the second transmission line, the disalignment being generated by differences in arrival time of the data sequences among the plurality of channels included in the second transmission line.

9. The transmission method according to claim 8, further comprising the steps of:

identifying, by the relay, based on the detected phase information, data frames indicating a predetermined phase from the data sequences received via the plurality of channels included in the first transmission line;

detecting, by the relay, from the identified data frames indicating the predetermined phase, a data frame received last due to the differences in arrival time of the data sequences among the plurality of channels included in the first transmission line;

calculating, by the relay, differences in arrival time between the detected data frame received last and the respective identified data frames indicating the predetermined phase;

correcting, by the relay, the disalignment in the phase of the plurality of data frames included in the data sequences received from the plurality of channels included in the first transmission line by delaying the respective identified data frames indicating the predetermined phase by the calculated differences in arrival time, and outputting the delayed data frames to the receiver;

identifying, by the receiver, based on the detected phase information, data frames indicating a predetermined phase from the data sequences received via the plurality of channels included in the second transmission line;

detecting, by the receiver, from the identified data frames indicating the predetermined phase, a data frame received last due to the differences in arrival time of the data sequences among the plurality of channels included in the second transmission line;

calculating, by the receiver, differences in arrival time between the detected data frame received last and the respective identified data frames indicating the predetermined phase;

delaying, by the receiver, the respective identified data frames indicating the predetermined phase by the calculated differences in arrival time; and distributing, by the receiver, the delayed data frames to the data sequences corresponding to the number of the plurality of channels included in the first transmission line used in the transmitting, by the transmitter, the data.

10. The transmission method according to claim 8, further comprising the step of inserting, by the transmitter, the channel information and the phase information in an idle time of the plurality of data frames included in the distributed data sequences corresponding to the number of the plurality of channels included in the first transmission line.

11. A transmission system, comprising:
a transmitter;
a first relay;
a second relay; and
a receiver,
the transmitter for receiving data to be transmitted to the receiver,
the first relay for transmitting the data transmitted by the transmitter to the second relay,
the second relay for transmitting the data transmitted by the first relay to the receiver,
the receiver for receiving the data transmitted by the second relay, wherein:
the transmitter and the first relay are coupled by a first transmission line, the first relay and the second relay are coupled by a second transmission line, and the second relay and the receiver are coupled by a third transmission line;
the first transmission line includes a plurality of channels;
the second transmission line includes a plurality of channels different in number from the plurality of channels included in the first transmission line;
the third transmission line includes the same number of channels corresponding to a number of the plurality of channels included in the first transmission line;
the transmitter is configured to:
distribute the data to be transmitted to data sequences corresponding to the number of the plurality of channels included in the first transmission line;
insert into the data sequences channel information indicating a channel to which the distributed data sequence is to be output; and
transmit the data to the first relay by outputting the distributed data sequences from the plurality of channels included in the first transmission line to the first relay; and
at least one of the first relay and the second relay having differences in arrival time of the data sequences received via the plurality of channels is configured to:
detect the channel information inserted into the data sequences received from the plurality of channels included in an upstream transmission line;
correct, based on the detected channel information, disalignment in an order of arrival of the data sequences received via the plurality of channels, the disalignment being generated by the differences in arrival time of the data sequences among the plurality of channels;
distribute the received data sequences to data sequences corresponding to a number of the plurality of channels included in a downstream transmission line; and
transmit the data by outputting the distributed data sequences from the plurality of channels included in the downstream transmission line.

* * * * *